(12) United States Patent
Hu et al.

(10) Patent No.: US 11,650,782 B2
(45) Date of Patent: May 16, 2023

(54) DISPLAY ADJUSTMENT METHOD AND DEVICE FOR BAR-SHAPED ELECTRONIC SHELF LABEL

(71) Applicant: BOE TECHNOLOGY GROUP CO., LTD., Beijing (CN)

(72) Inventors: Kejun Hu, Beijing (CN); Xiaohong Wang, Beijing (CN); Zhiguo Zhang, Beijing (CN); Xin Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 334 days.

(21) Appl. No.: 16/967,298

(22) PCT Filed: Dec. 16, 2019

(86) PCT No.: PCT/CN2019/125528
§ 371 (c)(1),
(2) Date: Aug. 4, 2020

(87) PCT Pub. No.: WO2020/140737
PCT Pub. Date: Jul. 9, 2020

(65) Prior Publication Data
US 2021/0026586 A1   Jan. 28, 2021

(30) Foreign Application Priority Data

Jan. 2, 2019  (CN) .......................... 201910001601.7

(51) Int. Cl.
G06F 3/147    (2006.01)
G06F 21/31    (2013.01)
G09F 3/20     (2006.01)

(52) U.S. Cl.
CPC .............. *G06F 3/147* (2013.01); *G06F 21/31* (2013.01); *G09F 3/208* (2013.01)

(58) Field of Classification Search
CPC ........... G09F 3/208; G06F 21/31; G06F 3/147
See application file for complete search history.

(56) References Cited

U.S. PATENT DOCUMENTS 10,674,340 B2   6/2020  Bottine et al.
10,824,924 B2   11/2020 Guan
(Continued)

FOREIGN PATENT DOCUMENTS

CN    103942591 A    7/2014
CN    104463479 A    3/2015
(Continued)

OTHER PUBLICATIONS

Office Action dated Mar. 19, 2020, issued in counterpart CN Application No. 201910001601.7, with English translation. (18 pages).

*Primary Examiner* — Abbas I Abdulselam
(74) *Attorney, Agent, or Firm* — WHDA, LLP

(57) ABSTRACT

The present disclosure discloses a display adjustment method and device for a bar-shaped electronic shelf label. The method according to the present disclosure includes: configuring a mobile terminal to be coupled with a bar-shaped electronic shelf label and obtain status information of display elements displayed on a display interface of the bar-shaped electronic shelf label; changing, by the mobile terminal, the position information of a display element from a first position information to a second position information and generating an element position adjustment instruction; configuring the bar-shaped electronic shelf label to receive the element position adjustment instruction, change the position of the display element from the first position to the second position in response to the element position adjustment instruction, and display the display element on the display interface of the bar-shaped electronic shelf label.

17 Claims, 8 Drawing Sheets

(56) References Cited

U.S. PATENT DOCUMENTS

| | | |
|---|---|---|
| 2013/0339151 A1 | 12/2013 | Bottine et al. |
| 2014/0353368 A1* | 12/2014 | Connolly .......... H04W 52/0216 |
| | | 235/375 |
| 2018/0218316 A1 | 8/2018 | Bottine et al. |
| 2019/0171402 A1* | 6/2019 | Ishizaki ............... G06Q 20/201 |
| 2019/0251408 A1 | 8/2019 | Guan |
| 2019/0253855 A1 | 8/2019 | Bottine et al. |

FOREIGN PATENT DOCUMENTS

| | | |
|---|---|---|
| CN | 107145918 A | 9/2017 |
| CN | 108140197 A | 6/2018 |
| CN | 108334912 A | 7/2018 |
| CN | 108364047 A | 8/2018 |
| CN | 108536658 A | 9/2018 |
| CN | 108924197 A | 11/2018 |
| CN | 108989994 A | 12/2018 |
| CN | 109766071 A | 5/2019 |
| WO | 2013/153290 A1 | 10/2013 |
| WO | 2015/156719 A1 | 10/2015 |
| WO | 2017/119748 A1 | 7/2017 |

\* cited by examiner

A mobile terminal is configured to be coupled with a bar-shaped electronic shelf label and obtain status information of display elements displayed on a display interface of the bar-shaped electronic shelf label ~ 101

The mobile terminal changes the position information of a display element from the first position information to the second position information and generates an element position adjustment instruction ~ 102

The bar-shaped electronic shelf label is configured to receive the element position adjustment instruction, change the position of the display element from the first position to the second position in response to the element position adjustment instruction, and display the display element on the display interface of the bar-shaped electronic shelf label ~ 103

Fig. 1

DISPLAY ADJUSTMENT METHOD AND DEVICE FOR BAR-SHAPED ELECTRONIC SHELF LABEL

CROSS-REFERENCE TO RELATED APPLICATION(S)

This application is a U.S. National Phase Application of International Application No. PCT/CN2019/125528, filed on Dec. 16, 2019, entitled "DISPLAY ADJUSTMENT METHOD AND DEVICE FOR BAR-SHAPED ELECTRONIC SHELF LABEL," which claims priority to Chinese Application No. 201910001601.7, filed on Jan. 2, 2.019, entitled "DISPLAY ADJUSTMENT METHOD AND DEVICE FOR BAR-SHAPED ELECTRONIC SHELF LABEL," both of which are incorporated herein by reference in their entirety.

TECHNICAL FIELD

The present disclosure relates to the technical field of data processing, and in particular, to a display adjustment method and device for a bar-shaped electronic shelf label.

BACKGROUND

With the continuous development of electronic technology, more and more electronic media appear in different application scenarios in life, among which, electronic display screens have been widely used, such as displaying price tags of goods through bar-shaped screens in supermarkets. When the position of the goods is changed, the position of the price tag in the bar-shaped screen also needs to be changed accordingly, that is, the position of the price tag and other elements in the bar-shaped screen needs to be adjusted.

At present, in order to adjust the position of the elements in the bar-shaped electronic shelf label, it is necessary to pre-lay a resistive touch bar under the electronic shelf label, and then perform a sliding touch operation on the resistive touch bar corresponding to the element to be adjusted, and adjust the element position according to the position of the pressed resistance bar. However, in actual applications, the current adjustment method requires a touch bar to be installed under the electronic shelf label. Due to contact jitter and accuracy drift in the touch adjustment, there is a situation where the user slides the touch bar but the position of the element does not change. This results in poor element display adjustment accuracy, complex design and high cost of the electronic shelf label, and which in turn leads to poor element display adjustment performance in the electronic shelf label.

SUMMARY

In view of this, one of the objects of the display adjustment method and device for a bar-shaped electronic shelf label provided by the present disclosure is to overcome the following problems to improve the performance of the element display adjustment in the bar-shaped electronic shelf label: in order to adjust the display of the elements in the bar-shaped electronic shelf label, it is necessary to install a touch bar under the bar-shaped electronic shelf label and move the elements by sliding the touch bar, resulting in high cost and complex design of the electronic shelf label, and poor element display adjustment accuracy, which in turn leads to poor element display adjustment performance.

In order to at least partially solve or alleviate the above problems, the present disclosure mainly provides the following technical solutions.

Some embodiments of the present disclosure provide a display adjustment method for a bar-shaped electronic shelf label, which comprises:

configuring a mobile terminal to be coupled with the bar-shaped electronic shelf label and obtain status information of display elements displayed on a display interface of the bar-shaped electronic shelf label, the status information of the display elements comprising at least position information of the display elements in the display interface;

changing, by the mobile terminal, the position information of a display element from a first position information to a second position information and generating an element position adjustment instruction;

configuring the bar-shaped electronic shelf label to receive the element position adjustment instruction, change the position of the display element from the first position to the second position in response to the element position adjustment instruction, and display the display element on the display interface of the bar-shaped electronic shelf label.

In some embodiments, after changing the position information of a display element from a first position information to a second position information, the method further comprises:

obtaining a size of the bar-shaped electronic shelf label, corresponding start position and end position of the adjusted element in the mobile terminal, and a final position of a final element in the mobile terminal;

calculating an adjustment ratio of the adjusted element according to the start position, the end position and the final position;

determining, as an adjustment distance of the adjusted element, a product of the adjustment ratio and the size of the bar-shaped electronic shelf label.

In some embodiments, the status information of the display elements further comprises information on a number of display elements and position information of each display element in the bar-shaped electronic shelf label, the generating the element position adjustment instruction comprises:

determining an adjusted position, in the bar-shaped electronic shelf label, of the adjusted element according to the position, in the bar-shaped electronic shelf label, of the adjusted element and the adjustment distance;

generating the element position adjustment instruction according to the adjusted position, in the bar-shaped electronic shelf label, of the adjusted element.

In some embodiments, before configuring a mobile terminal to be coupled with the bar-shaped electronic shelf label, the method further comprises:

receiving, by the mobile terminal, login information and verify the user's identity according to the login information;

when the verification is passed, triggering scanning of communicable bar-shaped electronic shelf labels, sorting and outputting the communicable bar-shaped electronic shelf labels according to strengths of communication signals so as to display the communicable bar-shaped electronic shelf labels in the mobile terminal;

sending a communication establishment request, the communication establishment request carrying identification information of the bar-shaped electronic shelf label to be communicated.

In some embodiments, the obtaining status information of display elements displayed on a display interface of the bar-shaped electronic shelf label comprises:

sending a display element status information obtaining request to instruct the bar-shaped electronic shelf label to extract, after receiving the display element status information obtaining request, the status information of the display elements and send encrypted status information of the display elements;

receiving the request response message, the request response message carrying display element status characteristic values corresponding to the status information of the display elements; and analyzing the display element status characteristic values to obtain the status information of the display elements.

In some embodiments, the changing the position information of the display element from the first position information to the second position information in response to the element position adjustment instruction, and displaying the display element on the display interface of the bar-shaped electronic shelf label comprises:

analyzing the element position adjustment instruction to obtain the adjusted position, in the bar-shaped electronic shelf label, of the adjusted element;

displaying the element on the display interface of the bar-shaped electronic shelf label according to the adjusted position.

In some embodiments, the method further comprises:

sending, by the bar-shaped electronic shelf label, broadcast information at preset time intervals, the broadcast information carrying identification information of the bar-shaped electronic shelf label;

obtaining the login information and verifying the user's identity according to the login information, when there is a mobile terminal that requests to establish communication with the bar-shaped electronic shelf label according to the broadcast information.

Other embodiments of the present disclosure provide a display adjustment device for a bar-shaped electronic shelf label, the device comprising:

a configuration unit configured to configure the mobile terminal to be coupled with the bar-shaped electronic shelf label;

an obtaining unit configured to obtain status information of display elements displayed on a display interface of the bar-shaped electronic shelf label, the status information of the display elements comprising at least first position information of the display elements in the display interface;

a generating unit configured to change, by the mobile terminal, the position information of a display element from the first position information to the second position information and generate an element position adjustment instruction;

the configuration unit is further configured to configure the bar-shaped electronic shelf label to receive the element position adjustment instruction;

a bar-shaped display unit configured to change the position of the display element from the first position to the second position in response to the element position adjustment instruction, and display the display element on the display interface of the bar-shaped electronic shelf label.

In some embodiments, the device further comprises: a calculation unit and a determining unit, The obtaining unit is further configured to obtain a size of the bar-shaped electronic shelf label, corresponding start position and end position of the adjusted element in the mobile terminal, and a final position of a final element in the mobile terminal;

The calculation unit is configured to calculate an adjustment ratio of the adjusted element according to the start position, the end position and the final position;

The determining unit is configured to determine, as an adjustment distance of the adjusted element, a product of the adjustment ratio and the size of the bar-shaped electronic shelf label.

In some embodiments, the generating unit comprises:

a determining module configured to determine an adjusted position, in the bar-shaped electronic shelf label, of the adjusted element according to the position, in the bar-shaped electronic shelf label, of the adjusted element and the adjustment distance;

a generating module configured to generate the element position adjustment instruction according to the adjusted position, in the bar-shaped electronic shelf label, of the adjusted element.

In some embodiments, the device further comprises:

a receiving unit configured to receive login information through the mobile terminal and verify the user's identity according to the login information;

an output unit configured to, when the verification is passed, trigger scanning of communicable bar-shaped electronic shelf labels, sort and output the communicable bar-shaped electronic shelf labels according to strengths of communication signals so as to display the communicable bar-shaped electronic shelf labels in the mobile terminal;

a receiving unit configured to send a communication establishment request, the communication establishment request carrying identification information of the bar-shaped electronic shelf label to be communicated.

In some embodiments, the obtaining unit comprises:

a sending module configured to send a display element status information obtaining request to instruct the bar-shaped electronic shelf label to extract, after receiving the display element status information obtaining request, the status information of the display elements and send encrypted status information of the display elements;

a receiving module configured to receive the request response message, the request response message carrying a display element status characteristic value corresponding to the status information of the display elements;

an analyzing module configured to analyze the display element status characteristic value to obtain the status information of the display elements.

In some embodiments, the bar-shaped displaying unit comprises:

an analyzing module configured to analyze the element position adjustment instruction to obtain the adjusted position of the adjusted element in the bar-shaped electronic shelf label;

a display module configured to display the adjusted element on the display interface of the bar-shaped electronic shelf label according to the adjusted position.

In some embodiments, the device further comprises: a sending unit, the sending unit is configured to send, by the bar-shaped electronic shelf label, broadcast information at preset time intervals, the broadcast information carrying identification information of the bar-shaped electronic shelf label;

the obtaining unit is further configured to obtain login information and verify the user's identity according to the login information, when there is a mobile terminal that requests to establish communication with the bar-shaped electronic shelf label according to the broadcast information.

In a third aspect, still other embodiments of the present disclosure provide a storage medium that stores a plurality of instructions, and the instructions are adapted to be loaded by a processor and implement the display adjustment method for a bar-shaped electronic shelf label described in the first aspect.

In a fourth aspect, further embodiments of the present disclosure provide an electronic device, and the electronic device comprises a storage medium and a processor;

the processor is adapted to implement various instructions;

the storage medium is adapted to store a plurality of instructions;

the instructions are adapted to be loaded by a processor and implement the display adjustment method for a bar-shaped electronic shelf label described in the first aspect.

BRIEF DESCRIPTION OF THE DRAWINGS

By reading the detailed description of the preferred embodiments below, various other advantages and benefits will become clear to those of ordinary skill in the art. The drawings are only for the purpose of illustrating some embodiments, and are not considered as a limitation of the disclosure. Throughout the drawings, the same reference numerals are used to refer to the same components. In the drawings:

FIG. 1 shows a flowchart of a display adjustment method for a bar-shaped electronic shelf label provided by an embodiment of the present disclosure;

DETAILED DESCRIPTION

Figure 2:
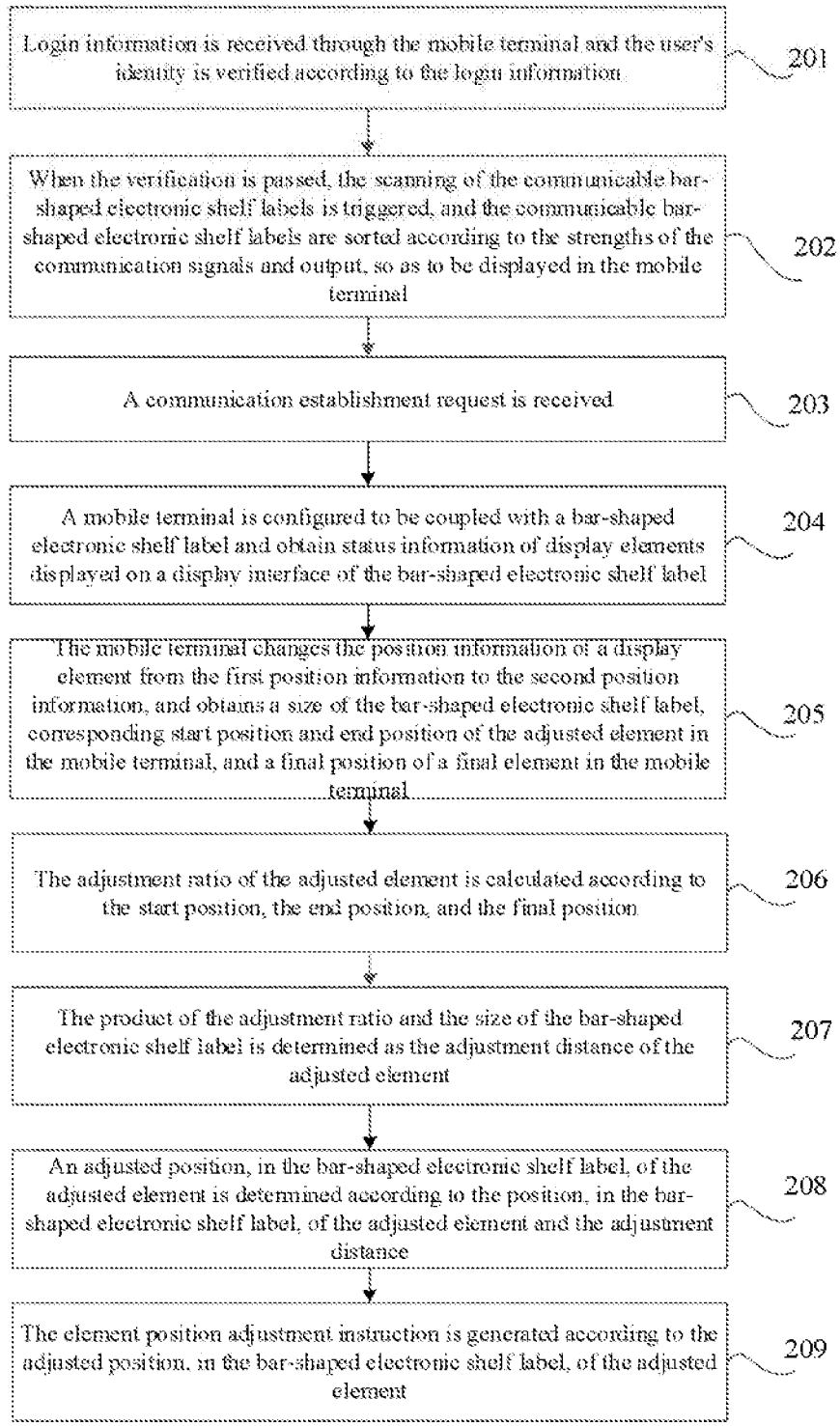
FIG. 2 shows a flowchart of another display adjustment method for a bar-shaped electronic shelf label provided by an embodiment of the present disclosure.

Exemplary embodiments of the present disclosure will be described in more detail below with reference to the accompanying drawings. Although the exemplary embodiments of the present disclosure are shown in the drawings, it is to be understood that the present disclosure may be implemented in various forms and should not be limited by the embodiments set forth herein. Rather, these embodiments are provided so that this disclosure will be more fully understood and the scope of the disclosure will be fully conveyed to those of ordinary skill in the art.

Some embodiments of the present disclosure provide a display adjustment method for a bar-shaped electronic shelf label. As shown in FIG. 1, the method includes the following steps.

101. A mobile terminal is configured to be coupled with a bar-shaped electronic shelf label and obtain status information of display elements displayed on a display interface of the bar-shaped electronic shelf label.

In some embodiments, the status information of the display elements includes at least the first position information of the display elements in the display interface. In some embodiments, the status information of the elements includes at least information on the number of display elements and/or position information of each display element in the bar-shaped electronic shelf label. The display elements may be pictures, texts, numbers, and the like, in a bar-shaped electronic shelf label. In some embodiments, the mobile terminal and the bar-shaped electronic shelf label in this step may be coupled via Bluetooth or may be coupled via a local area network, which is not specifically limited in the embodiments of the present disclosure.

For the embodiments of the present disclosure, a specific implementation manner may be that a user installs, in a mobile terminal, an application (APP) for controlling an electronic shelf. In some embodiments, after the mobile terminal is configured to be coupled with the bar-shaped electronic shelf label, the application may obtain, from the corresponding server (for example, the server 930 shown in FIG. 9), the status information of the display elements in the bar-shaped electronic shelf label that has established communication with the mobile terminal. In addition, in other embodiments, the application may also obtain, directly from the bar-shaped electronic shelf label, the status information of the display elements of the bar-shaped electronic shelf label.

102. The mobile terminal changes the position information of a display element from the first position information to the second position information and generates an element position adjustment instruction.

The element position adjustment instruction may carry the corresponding adjusted position, in the bar-shaped shelf label, of the element adjusted by the user this time.

It should be noted that, after the mobile terminal receives, in the above step, the status information of the display elements in the bar-shaped shelf label that has been coupled to and established communication with the mobile terminal, the mobile terminal displays each display element in the bar-shaped shelf label through the GUI (Graphical User Interface) of the mobile terminal, so that the user is capable of performing the element position adjustment operation through the mobile terminal. For example, when the user drags any display element from one position to another position to adjust the position, the element corresponds to a start position and an end position in the mobile terminal. The position where the last element in the horizontal or vertical direction is located in the mobile terminal is the final position. Then, the new position of the adjusted element in the bar-shaped shelf label may be determined according to the position data generated by the adjustment operation.

103. The bar-shaped electronic shelf label is configured to receive the element position adjustment instruction, change the position of the display element from the first position to the second position in response to the element position adjustment instruction, and display the display element on the display interface of the bar-shaped electronic shelf label.

In the embodiment of the present disclosure, the user may perform the adjustment operation of the position of the display element multiple times through the mobile terminal, and each time the operation is performed, the above steps 101 to 103 may be repeated to complete the display element position adjustment operation. Since the specific adjusted position of the adjusted element in the bar-shaped shelf label has been determined in the above step, at this step, the adjusted position information carried in the received adjustment instruction may be directly analyzed and the display element may be displayed to complete the element display adjustment operation. However, it should be noted that in other embodiments, the conversion from the position in the mobile terminal to the position in the bar-shaped shelf label may also be performed at the bar-shaped shelf label instead of the mobile terminal.

For the embodiments of the present disclosure, when the user needs to adjust the display of elements in the bar-shaped shelf label, the operation may be performed directly in the mobile terminal, without installing a touch bar under the bar-shaped shelf label and sliding the touch bar for adjustment. When a certain bar-shaped shelf label needs to be adjusted, the adjustment operation may be performed on the display interface of the mobile terminal after the bar-shaped shelf label is triggered to couple with the mobile terminal, which greatly simplifies the adjustment operation of the display of elements in the bar-shaped shelf label and improves the user experience.

Some embodiments of the present disclosure provide a display adjustment method for a bar-shaped electronic shelf label, including: configuring a mobile terminal to be coupled with a bar-shaped electronic shelf label and obtain status information of display elements displayed on a display interface of the bar-shaped electronic shelf label; changing, by the mobile terminal, the position information of a display element from a first position information to a second position information and generating an element position adjustment instruction; configuring the bar-shaped electronic shelf label to receive the element position adjustment instruction, change the position of the display element from the first position to the second position in response to the element position adjustment instruction, and display the display element on the display interface of the bar-shaped electronic shelf label. In the related art, in order to adjust the display of elements in the bar-shaped electronic shelf label, it is necessary to install a touch bar under the bar-shaped electronic shelf label, and slide the touch bar to move the elements. Compared with this, the embodiment of the present disclosure does not need to install a touch bar in the bar-shaped electronic shelf label, and avoids the problem of poor adjustment accuracy caused by touch jitter when adjusting the element display by sliding the touch bar, thereby improving the performance of the adjustment of the element display in the bar-shaped electronic shelf label.

In order to explain in more detail below, an embodiment of the present disclosure provides another display adjustment method for a bar-shaped electronic shelf label. As shown in FIG. 2, the method includes the following steps.

201. Login information is received through the mobile terminal and the user's identity is verified according to the login information.

The login information may be account and password information entered by the user in the mobile terminal, or may be fingerprint, voice and other information entered by the user. The specific verification method in this step may be a method for verifying the user's identity in the related art, which is not described in detail in the embodiments of the present disclosure.

It should be noted that the specific implementation of the embodiments of the present disclosure may be that a user installs, in a mobile terminal, an application (APP) for controlling an electronic shelf, therefore when the user launches the APP in the mobile terminal and enters the corresponding login information to log in, the server corresponding to the application may receive the login information entered by the user and verify it.

For the embodiment of the present disclosure, before adjusting the position of the display element in the bar-shaped electronic shelf label, the uses identity is first verified according to the login information entered by the user, which can ensure that the user's identity is legal and avoid the display element position display error caused by the user's unintentional touch and movement, thereby improving the security of the mobile terminal and the accuracy of the position of the display element.

202. When the verification is passed, the scanning of the communicable bar-shaped electronic shelf labels is triggered, and the communicable bar-shaped electronic shelf labels are sorted according to the strengths of the communication signals and outputted, so as to be displayed in the mobile terminal.

The signal strength RSSI (Received Signal Strength Indication) is the strength of the signal of each bar-shaped electronic shelf label received by the mobile terminal. It should be noted that there are a plurality of bar-shaped electronic shelf labels in a specific application scenario, so when the APP in the mobile terminal is started, a plurality of bar-shaped electronic shelf labels that are connectable and communicable may be scanned. In this case, sorting according to signal strength can make the information of the bar-shaped electronic shelf label closer to the user be displayed forward, so that the user can quickly find and connect the bar-shaped electronic shelf label in front of the user, of which the position of the element needs to be adjusted, which improves the user experience, and improves the efficiency of adjusting the position of the display elements in the bar-shaped electronic shelf label. In addition, in other embodiments, the scanned bar-shaped electronic shelf labels may also be displayed in other orders, for example, in the order of label identifiers, in the order of label names, and so on.

203. A communication establishment request is received.

In some embodiments, the communication establishment request may carry identification information of the bar-shaped electronic shelf label to be communicated. In practical applications, there is respective identification information on the appearance of the bar-shaped electronic shelf label (for example, printed, pasted, displayed, or appearing in any other appropriate manner at the appropriate position of the label). Therefore, the user may first confirm the identification information above the bar-shaped electronic shelf label that needs to be adjusted, and then search, for example, from top to bottom, in the communicable bar-shaped electronic shelf labels according to the identification information in the mobile terminal interface, and click on the identification information of the bar-shaped electronic shelf label. Then, the server may receive the communication establishment request, and then trigger the establishment of communication between the mobile terminal and the bar-shaped electronic shelf label, so as to respond to the request and enable the mobile terminal and the bar-shaped electronic shelf label to be coupled. However, in other embodiments, the mobile terminal and the bar-shaped electronic shelf label may communicate directly without the coordination of the server.

204. A mobile terminal is configured to be coupled with a bar-shaped electronic shelf label and obtain status information of display elements displayed on a display interface of the bar-shaped electronic shelf label.

In some embodiments, the status information of the display elements may include the first position information of the display elements in the display interface, and the status information of the display elements also includes information on the number of display elements and/or the position information of each display element in the bar-shaped electronic shelf label. The position of the display element in the bar-shaped electronic shelf label may be the coordinate value of each display element in the bar-shaped electronic shelf label, or the sequence number of the display element in the arrangement. For example, when the length of the bar-shaped electronic shelf label is 2000 pixels, and 20 digital prices are displayed horizontally on the display, the position of the display element may be its horizontal pixel coordinate in the bar-shaped electronic shelf label, such as 100, 1200, and the like, or may be the horizontal sequence number of each digital price in the bar-shaped electronic shelf label, which is not specifically limited in the embodiment of the present disclosure.

In some embodiments, the step 204 may specifically include: sending a display element status information obtaining request to instruct the bar-shaped electronic shelf label to extract, after receiving the display element status information obtaining request, the status information of the display elements and send encrypted status information of the display elements; receiving a request response message, the request response message carrying display element status characteristic values corresponding to the status information of the display elements; and analyzing the display element status characteristic values to obtain the status information of the display elements. After the communication between the mobile terminal and the bar-shaped electronic shelf label is established via Bluetooth, the data transmitting party and the data receiving party need to abide by the corresponding protocol. That is, when reading data or writing data, it is necessary to read characteristic values or write characteristic values. Therefore, in this step, when it is necessary to read the display element status information in the bar-shaped electronic shelf label, it is necessary to write a display element status characteristic value corresponding to the display element status information into the bar-shaped electronic shelf label, and then the bar-shaped electronic shelf label feeds back the element status information after receiving the characteristic value.

205. The mobile terminal changes the position information of a display element from the first position information to the second position information, and obtains a size of the bar-shaped electronic shelf label, corresponding start position and end position of the adjusted element in the mobile terminal, and a final position of a final element in the mobile terminal.

In some embodiments, the final element is the last display element arranged. For example, when each display element is arranged vertically in the mobile terminal, the final element may be the lowest element, and when each element is arranged horizontally in the mobile terminal, the final element may be the rightmost element. In this step, the start position, end position, and final position may be relative distances with reference to either end of the mobile terminal. For example, the start position may be 3 cm from the top of the mobile terminal. In addition, the size of the bar-shaped electronic shelf label may be a size in pixels, a length size, or the like, which is not specifically limited in the embodiments of the present disclosure.

It should be noted that the position of the final element in the embodiment of the present disclosure is a reference position for determining the adjustment ratio of the adjusted element, so the adjustment ratio of the adjusted element may also be calculated according to the first element, or any display element in the middle, which is not specifically limited in the embodiments of the present disclosure.

In some embodiments, in the above step, after receiving the display element status information in the bar-shaped electronic shelf label that has established communication with the mobile terminal, the mobile terminal may display, through its interface, each display element in the bar-shaped electronic shelf label. At this time, each element corresponds to a unique position in the mobile terminal, and the user may drag any element that needs to be adjusted. Thus, the mobile terminal may receive the start and end positions of the adjusted element in the mobile terminal when the user performs the adjustment operation of the display element position and the position of the final element in the mobile terminal, so that the mobile terminal can calculate the position of the adjusted element in the bar-shaped electronic shelf label according to the received position data. In addition, in other embodiments, the calculation and subsequent calculations may also be implemented in whole or in part at the server and/or the label, rather than at the mobile terminal, and it is only necessary to provide the calculated position to the label at the end.

206. The adjustment ratio of the adjusted element is calculated according to the start position, the end position, and the final position.

Specifically, in this step, the ratio between the first difference between the end position and the start position and the second difference between the final position and the start position may be determined as the adjustment ratio.

For example, in the bar-shaped electronic shelf label A, 10 price tags are displayed in the horizontal direction, and the identification information of the 10 price tag elements is arranged vertically on the display interface of the mobile terminal. When the user adjusts the third price tag element in the vertical order, the user move it from 2.5 cm from the top of the mobile terminal to 4 cm from the top of the mobile terminal, and the final element is 10 cm from the to of the mobile terminal. Thus, in this step, the adjustment ratio of this element is:

$$\frac{4-2.5}{10-2.5} = 20\%.$$

207. The product of the adjustment ratio and the size of the bar-shaped electronic shelf label is determined as the adjustment distance of the adjusted element.

As the example described in the above step, if the calculated adjustment ratio of the adjusted element is 20%, and the size of the bar-shaped electronic shelf label is 160 pixels, then in this step, the adjustment distance of the adjusted element may be determined to be 20%×160=32 pixels.

It should be noted that since the size of the bar-shaped electronic shelf label and the size of the interface of the mobile terminal are usually much different, the position of each element in the mobile terminal is different from that in the bar-shaped electronic shelf label. It is not accurate to adjust the position of the adjusted element in the bar-shaped electronic shelf label according to the adjusted position of the adjusted element in the mobile terminal. The embodiment of the present disclosure determines the adjustment distance of the adjusted element in the bar-shaped electronic shelf label by combining the adjustment ratio corresponding to the adjusted element in the mobile terminal and the size of the bar-shaped electronic shelf label. In this way, the corresponding moving distance of the adjusted element in the bar-shaped electronic shelf label can be accurately calculated, and the accuracy of the position adjustment of the elements in the bar-shaped electronic shelf label is ensured.

208. An adjusted position, in the bar-shaped electronic shelf label, of the adjusted element is determined according to the position, in the bar-shaped electronic shelf label, of the adjusted element and the adjustment distance.

In the embodiment of the present disclosure, the adjustment distance calculated in the above step may be a negative value, so in this step, according to the sum of the initial position of the element in the bar-shaped electronic shelf label and the adjustment distance, the end position of the adjusted element in the bar-shaped electronic shelf label may be determined.

209. The element position adjustment instruction is generated according to the adjusted position, in the bar-shaped electronic shelf label, of the adjusted element.

Further, the bar-shaped electronic shelf label is configured to receive the element position adjustment instruction, change the position of the display element from the first position to the second position in response to the element position adjustment instruction, and display the display element on the display interface of the bar-shaped electronic shelf label.

For the embodiments of the present disclosure, when transmitting between the mobile terminal, the server, and the bar-shaped electronic shelf label, the data may first be encrypted using a preset algorithm, and then the encrypted data may be transmitted. In this step, the specific encryption method may be the data encryption method in the related art, which is not described in detail in the embodiments of the present disclosure. By encrypting and transmitting the data, the security performance of the data transmission can be ensured, thereby improving the security of the display element position adjustment.

Figure 3:
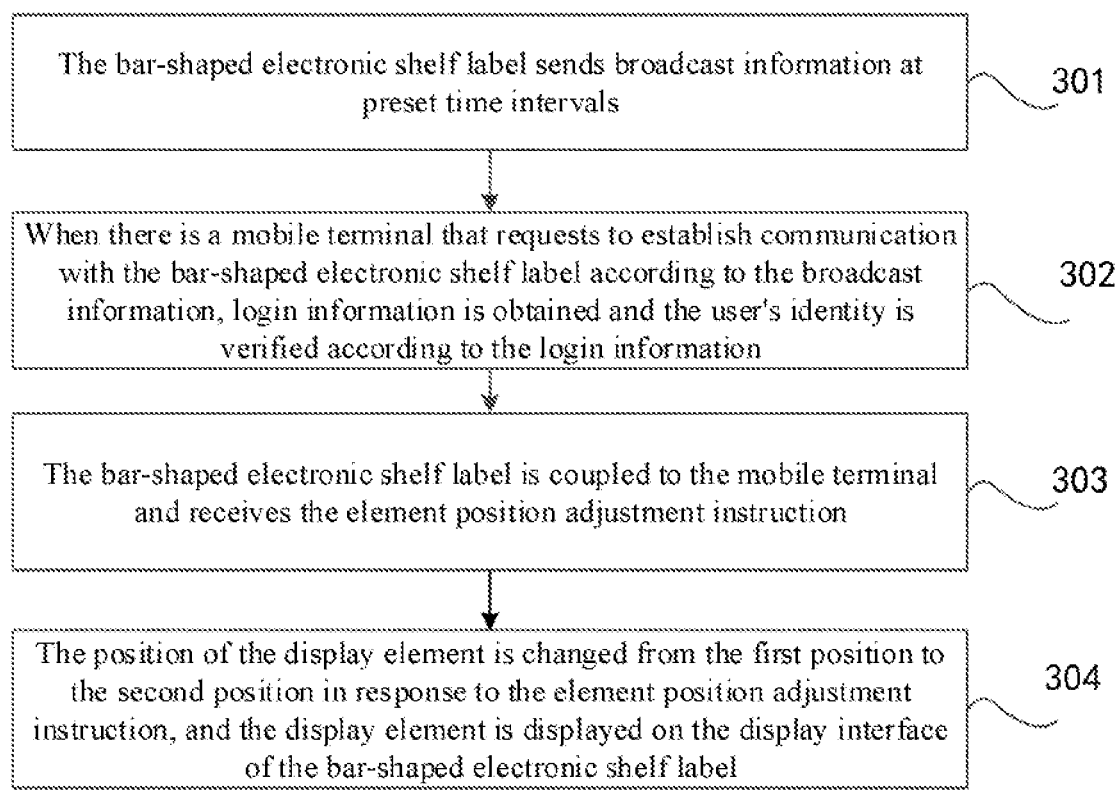
FIG. 3 shows a flowchart of still another display adjustment method for a bar-shaped electronic shelf label provided by an embodiment of the present disclosure.

Further, an embodiment of the present disclosure also provides another display adjustment method for a bar-shaped electronic shelf label. As shown in FIG. 3, the method includes the following steps.

301. The bar-shaped electronic shelf label sends broadcast information at preset time intervals.

The broadcast information carries the identification information of the bar-shaped electronic shelf label. The time interval may be set according to different application scenarios, such as 10 seconds and 1 minute. In the embodiment of the present disclosure, the bar-shaped electronic shelf label transmits broadcast information at a certain time interval. Therefore, once the user needs to adjust the display elements in the bar-shaped electronic shelf label and then starts the mobile terminal, the mobile terminal can receive the broadcast information sent by the bar-shaped electronic shelf label and establish a coupling communication with it.

302. When there is a mobile terminal that requests to establish communication with the bar-shaped electronic shelf label according to the broadcast information, login information is obtained and the user's identity is verified according to the login information.

Further, when the verification is passed, the bar-shaped electronic shelf label is triggered to be coupled with the mobile terminal.

303. The bar-shaped electronic shelf label is coupled to the mobile terminal and receives the element position adjustment instruction.

The specific coupling method may be to connect through a communication module built into the bar-shaped electronic shelf label. As an example, the coupling communication is performed through a Bluetooth low energy chip (such as a BLE SoC). It should be noted that although the use of the Wi-Fi & Bluetooth two-in-one module can make the bar-shaped electronic shelf label have a more compact PCB (Printed Circuit Board) space, Wi-Fi communication and Bluetooth communication share a physical interface (such as SDIO) to communicate with the ARM processor, and in actual situations, the occurrence of these two kinds of communication, that is, transmitting video and pictures through Wi-Fi and interactively controlling with mobile terminals through Bluetooth, is random. Therefore, in order to prevent the two kinds of communication from working at the same time and affecting performance, a separate BLE SoC is used in the embodiments of the present disclosure to implement the Bluetooth coupling communication function. However, the present disclosure is not limited to this. For example, in other embodiments, a Wi-Fi/Bluetooth integrated module may also be used.

For the embodiment of the present disclosure, before this step, a request for obtaining the status information of the display elements sent by the mobile terminal may be received, and after receiving the request for obtaining the status information of the elements, the status information of the display elements may be extracted and the encrypted status information of the display elements may be sent, so that the user can make display adjustments with the current status information of the display elements.

Similarly, in this embodiment, the data transmission between the bar-shaped electronic shelf label and the mobile terminal is performed through the built-in BLE circuit unit in the bar-shaped electronic shelf label. When the mobile terminal side needs to read the current display status of the display elements in the bar-shaped electronic shelf label, it writes the display element state characteristic value into the BLE circuit unit in the bar-shaped electronic shelf label. Therefore, when the bar-shaped electronic shelf label receives the characteristic value, a request for obtaining the status information of the elements is received.

In addition, after receiving the display element status characteristic value, the BLE circuit unit in the bar-shaped electronic shelf label calls the ARM processor through the serial interface, so that the processor obtains the status information of the elements currently displayed on the bar-shaped electronic shelf label, and then uses the BLE circuit unit to send the information to the mobile terminal in the form of the display element status characteristic value.

304. The position of the display element is changed from the first position to the second position in response to the element position adjustment instruction, and the display element is displayed on the display interface of the bar-shaped electronic shelf label.

For the embodiment of the present disclosure, the bar-shaped electronic shelf label only needs to couple with the mobile terminal, send the current element status information in the bar-shaped electronic shelf label to the mobile terminal, and receive the processed position adjustment data sent by the server or the mobile terminal side.

This step may specifically include: analyzing the element position adjustment instruction to obtain the adjusted position of the adjusted element in the bar-shaped electronic shelf label; displaying the adjusted element on the display interface of the bar-shaped electronic shelf label according to the adjusted position. It should be noted that when transmitting data between the mobile terminal and the bar-shaped electronic shelf label, the data may be sent or received by the BLE circuit unit built in the bar-shaped electronic shelf label. Then the BLE circuit unit may communicate with the ARM processor built in the bar-shaped electronic shelf label, and finally the processor analyzes the data to display the display elements according to the adjusted data.

Specifically, in some embodiments, the mobile terminal writes the adjusted data to the corresponding adjusted display element state characteristic value according to the Bluetooth communication protocol. After receiving the characteristic value, the BLE circuit unit in the bar-shaped electronic shelf label sends the characteristic value to the internal preset processor through the serial interface. The processor analyzes the characteristic value, obtains the display status of the display element after adjustment and displays the element.

Figure 4:
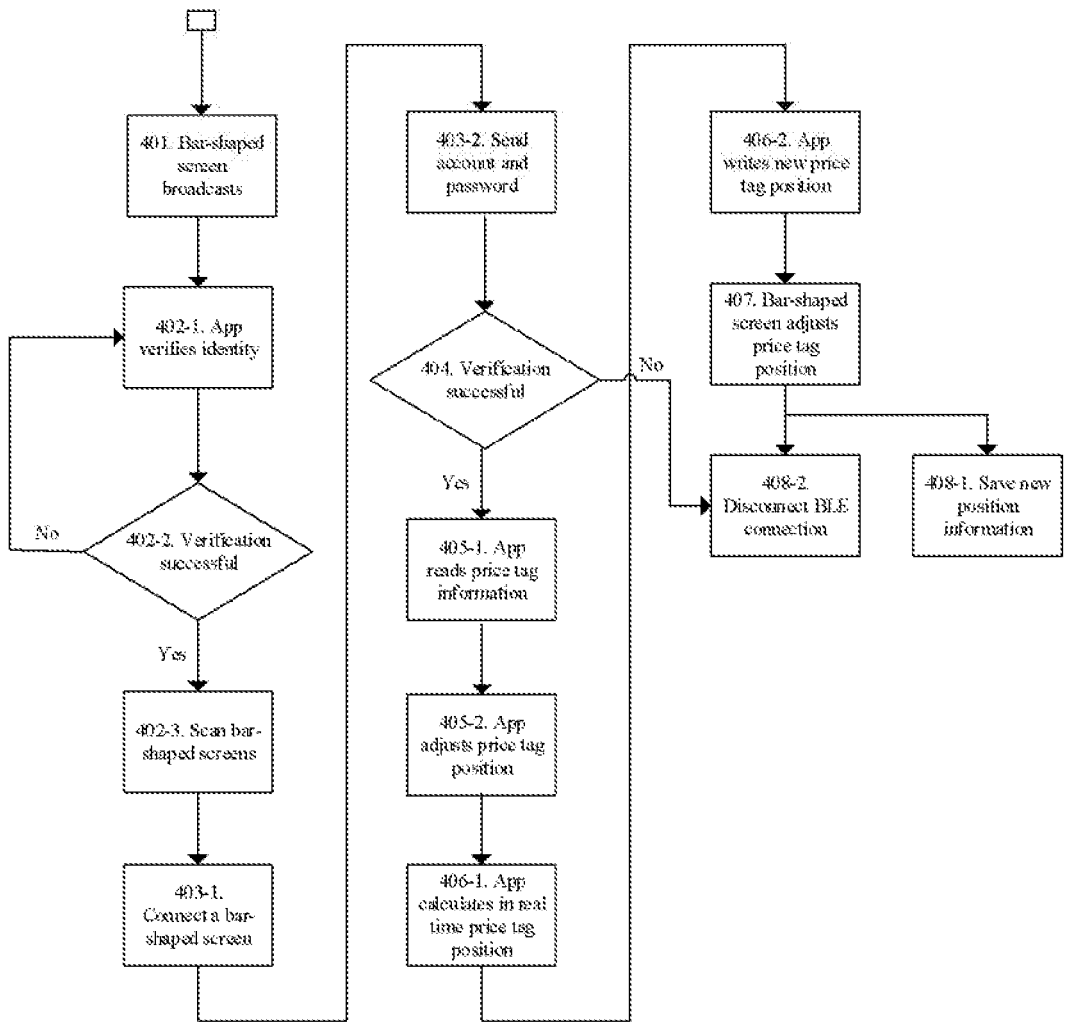
FIG. 4 shows a flowchart of yet another display adjustment method for a bar-shaped electronic shelf label provided by an embodiment of the present disclosure.

The above embodiments have explained in detail the process of adjusting the display elements by the server, the mobile terminal and the bar-shaped electronic shelf label. The following provides a bar-shaped screen as an example to illustrate the interaction among the mobile terminal, the server and the bar-shaped electronic shelf label. As shown in FIG. 4, a fourth display adjustment method for a bar-shaped electronic shelf label provided by an embodiment of the present disclosure is shown in FIG. 4. The method includes the following steps.

401. The bar-shaped screen sends broadcast information at preset time intervals.

402. The server verifies the user's identity according to the verification information entered by the user in the APP of the mobile terminal. When the verification is successful, the mobile terminal is triggered to scan bar-shaped screens that can be connected to establish communication.

403. The mobile terminal determines a bar-shaped screen with which communication is to be established according to the communication instruction input by the user, and sends login information such as the account and password entered by the user to the bar-shaped screen.

404. The bar-shaped screen verifies the received user login information. If the verification is successful, the bar-shaped screen and the mobile terminal establish communication and step 405 is performed, otherwise the BLE Bluetooth connection is disconnected.

405. The mobile terminal reads the price tag information in the bar-shaped screen, and receives data generated when the user performs the price tag position adjustment operation in the mobile terminal.

406. The mobile terminal calculates in real time the price tag position, in the bar-shaped screen, of the price tag adjusted by the user, and writes the adjusted price tag position data into the bar-shaped screen through communication between the mobile terminal and the bar-shaped screen.

407. The bar-shaped screen receives the new price tag position data and adjusts the price tag position according to the data.

408. The bar-shaped screen saves the received new price tag position information and disconnects the BLE Bluetooth connection.

In order to achieve the above object, according to another aspect of the present disclosure, an embodiment of the present disclosure also provides a storage medium, the storage medium includes a stored program, wherein, when the program is running, the device where the storage medium is located is controlled to execute the display adjustment method for the bar-shaped electronic shelf label described above.

In order to achieve the above object, according to another aspect of the present disclosure, an embodiment of the present disclosure further provides a processor for running a program, wherein the display adjustment method for the bar-shaped electronic shelf label described above is performed while the program is running.

Figure 5:
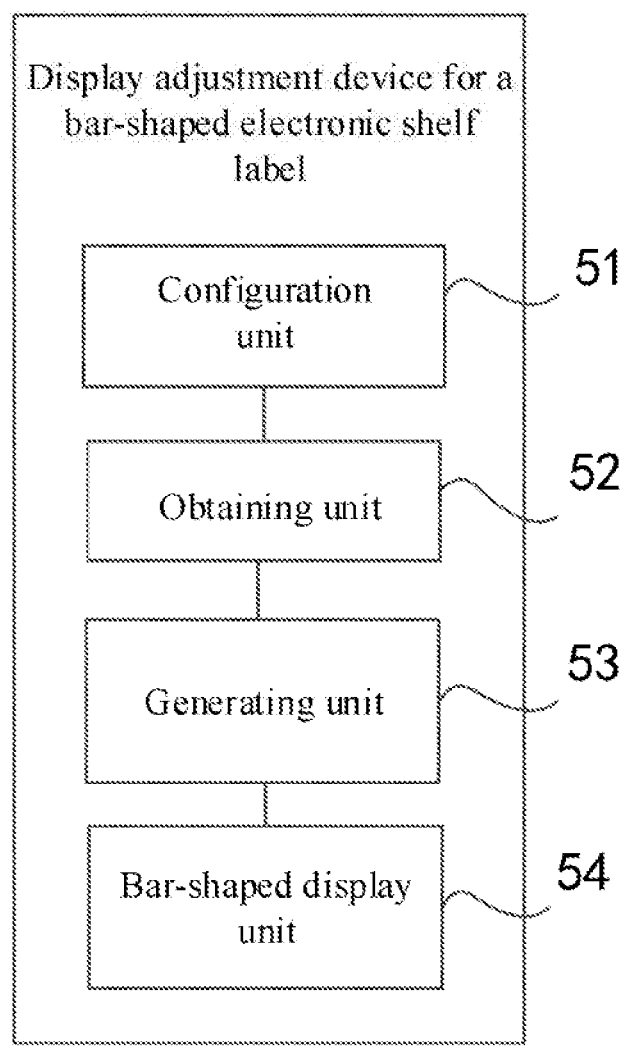
FIG. 5 shows a block diagram of the composition of a display adjustment device for a bar-shaped electronic shelf label provided by an embodiment of the present disclosure.

Further, as an implementation of the method shown in FIG. 1 and FIG. 2 above, another embodiment of the present disclosure further provides a display adjustment device for a bar-shaped electronic shelf label. The device embodiment corresponds to the foregoing method embodiment. For ease of reading, the device embodiment will not repeat the details of the foregoing method embodiment one by one, but it should be clear that the device in this embodiment can correspondingly implement all the content in the foregoing method embodiment. The device is used to improve the display adjustment performance of bar-shaped electronic shelf labels. As shown in FIG. 5, the device includes:

a configuration unit 51 configured to configure the mobile terminal to be coupled with the bar-shaped electronic shelf label;

an obtaining unit 52 configured to obtain status information of display elements displayed on a display interface of the bar-shaped electronic shelf label. In some embodiments, the status information of the display elements includes at least the first position information of the display elements in the display interface;

a generating unit 53 configured to change, by the mobile terminal, the position information of a display element from the first position information to the second position information and generate an element position adjustment instruction;

the configuration unit 51 is further configured to configure the bar-shaped electronic shelf label to receive the element position adjustment instruction;

a bar-shaped display unit 54 configured to change the position of the display element from the first position to the second position in response to the element position adjustment instruction, and display the display element on the display interface of the bar-shaped electronic shelf label.

Figure 6:
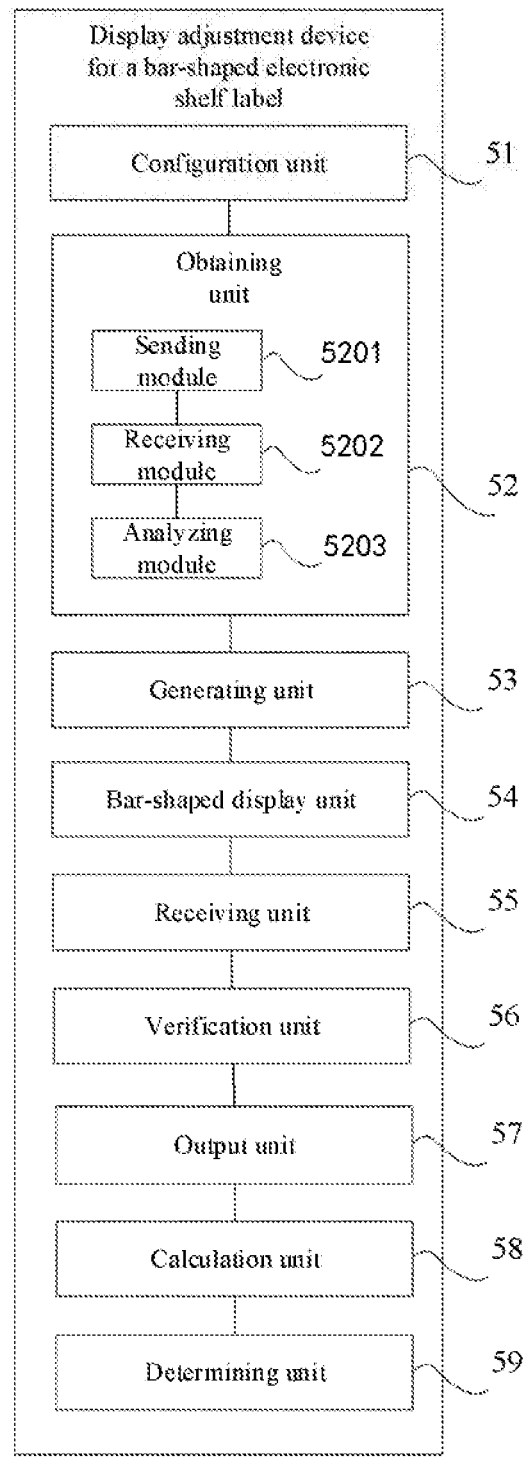
FIG. 6 shows a block diagram of the composition of another display adjustment device for a bar-shaped electronic shelf label provided by an embodiment of the present disclosure.

Further, as shown in FIG. 6, the device further includes: a receiving unit 55, a verification unit 56, and an output unit 57.

The receiving unit 55 is configured to receive login information through the mobile terminal.

The verification unit 56 is configured to verify the user's identity according to the login information.

The output unit 57 is configured to, when the verification is passed, trigger scanning of communicable bar-shaped electronic shelf labels, sort and output the communicable bar-shaped electronic shelf labels according to strengths of communication signals so as to display the communicable bar-shaped electronic shelf labels in the mobile terminal.

Further, as shown in FIG. 6, the obtaining unit 52 includes:

a sending module 5201 configured to send a display element status information obtaining request to instruct the bar-shaped electronic shelf label to extract, after receiving the display element status information obtaining request, the status information of the display elements and send encrypted status information of the display elements.

a receiving module 5202 configured to receive the request response message, the request response message carrying a display element status characteristic value corresponding to the status information of the display elements.

an analyzing module 5203 configured to analyze the display element status characteristic value to obtain the status information of the display elements.

Further, as shown in FIG. 6, the device further includes: a calculation unit 58 and a determining unit 59.

The obtaining unit 52 is further configured to change, by the mobile terminal, the position information of a display element from the first position information to the second position information, and obtain a size of the bar-shaped electronic shelf label, corresponding start position and end position of the adjusted element in the mobile terminal, and a final position of a final element in the mobile terminal.

The calculation unit 58 is configured to calculate an adjustment ratio of the adjusted element according to the start position, the end position and the final position.

The determining unit 59 is configured to determine, as an adjustment distance of the adjusted element, a product of the adjustment ratio and the size of the bar-shaped electronic shelf label.

The determining unit 59 is further configured to determine an adjusted position, in the bar-shaped electronic shelf label, of the adjusted element according to the position, in the bar-shaped electronic shelf label, of the adjusted element and the adjustment distance.

Further, as shown in FIG. 6,

The generating unit 53 is configured to generate the element position adjustment instruction according to the adjusted position, in the bar-shaped electronic shelf label, of the adjusted element.

Figure 7:
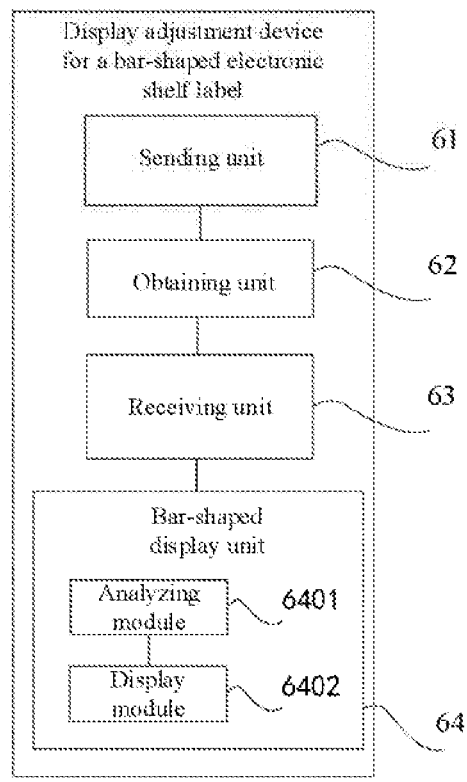
FIG. 7 shows a block diagram of the composition of still another display adjustment device for a bar-shaped electronic shelf label provided by an embodiment of the present disclosure.

Further, as an implementation of the method shown in FIG. 3 above, another embodiment of the present disclosure also provides another display adjustment device for a bar-shaped electronic shelf label. The device embodiment corresponds to the foregoing method embodiment. For ease of reading, the device embodiment will not repeat the details of the foregoing method embodiment one by one, but it should be clear that the device in this embodiment can correspondingly implement all the content in the foregoing method embodiment. The device is used to improve the display adjustment performance of bar-shaped electronic shelf labels. As shown in FIG. 7, the device includes:

a sending unit 61 configured to send, by the bar-shaped electronic shelf label, broadcast information at preset time intervals, the broadcast information carrying identification information of the bar-shaped electronic shelf label;

an obtaining unit 62 configured to obtain login information and verify the user's identity according to the login information, when there is a mobile terminal that requests to establish communication with the bar-shaped electronic shelf label according to the broadcast information;

a receiving unit 63 configured to couple the bar-shaped electronic shelf label to the mobile terminal and receive the element position adjustment instruction.

Further, as shown in FIG. 7, the device further includes:

a bar-shaped display unit 64 configured to change the position information of the display element from the first position information to the second position information in response to the element position adjustment instruction, and display the display element on the display interface of the bar-shaped electronic shelf label.

Further, as shown in FIG. 7, the bar-shaped display unit 64 includes:

an analyzing module 6401 configured to analyze the element position adjustment instruction to obtain the adjusted position of the adjusted element in the bar-shaped electronic shelf label;

a display module 6402 configured to display the adjusted element on the display interface of the bar-shaped electronic shelf label according to the adjusted position.

The embodiment of the present disclosure provides a display adjustment method and device for a bar-shaped electronic shelf label, including: configuring a mobile terminal to be coupled with a bar-shaped electronic shelf label and obtain status information of display elements displayed on a display interface of the bar-shaped electronic shelf label; changing, by the mobile terminal, the position information of a display element from a first position information to a second position information and generating an element position adjustment instruction; configuring the bar-shaped electronic shelf label to receive the element position adjustment instruction, change the position information of the display element from the first position information to the second position information in response to the element position adjustment instruction, and display the display element on the display interface of the bar-shaped electronic shelf label. In the related art, in order to adjust the display of elements in the bar-shaped electronic shelf label, it is necessary to install a touch bar under the bar-shaped electronic shelf label, and slide the touch bar to move the elements. Compared with this, the embodiment of the present disclosure does not need to install a touch bar in the bar-shaped electronic shelf label, and avoids the problem of poor adjustment accuracy caused by touch jitter when adjusting the element display by sliding the touch bar, thereby improving the performance of the adjustment of the element display in the bar-shaped electronic shelf label.

The device includes a processor and a memory. The above configuration unit, obtaining unit, generating unit, and bar-shaped display unit are all stored as program units in the memory, and the processor executes the above program units stored in the memory to achieve the corresponding function.

The device further includes a processor and a memory. The above sending unit, obtaining unit, receiving unit, and the like, are all stored as program units in the memory, and the processor executes the above program units stored in the memory to achieve the corresponding function.

The processor contains a core, and the core retrieves the corresponding program unit from the memory. One or more cores can be set, and the performance of the display adjustment of the elements in the bar-shaped electronic shelf label is improved by adjusting the core parameters.

The memory may include non-permanent memory (random access memory (RAM)) and/or non-volatile memory (such as read-only memory (ROM) or flash memory (flash RAM)) in computer-readable media. The memory includes at least one memory chip.

An embodiment of the present disclosure provides a storage medium on which a program is stored. The program, when executed by a processor, causes the processor to implement the display adjustment method for the bar-shaped electronic shelf label described in any one of the above embodiments.

An embodiment of the present disclosure provides a processor for running a program. The program, when running, causes the processor to implement the display adjustment method for the bar-shaped electronic shelf label described in any one of the above embodiments.

An embodiment of the present disclosure provides a device. The device includes a processor, a memory, and a program stored on the memory and executable on the processor. When the processor executes the program, the following steps are implemented:

configuring the mobile terminal to be coupled with a bar-shaped electronic shelf label and obtain status information of display elements displayed on a display interface of the bar-shaped electronic shelf label, the status information of the display elements comprising at least first position information of the display elements in the display interface;

changing, by the mobile terminal, the position information of a display element from the first position information to the second position information and generating an element position adjustment instruction;

configuring the bar-shaped electronic shelf label to receive the element position adjustment instruction, change the position of the display element from the first position to the second position in response to the element position adjustment instruction, and display the display element on the display interface of the bar-shaped electronic shelf label.

The devices in this disclosure may be servers, PCs, PADs, mobile phones, and the like.

This application also provides a computer program product, which when executed on a data processing device, is adapted to execute program code initialized with the following method steps: configuring a mobile terminal to be coupled with a bar-shaped electronic shelf label and obtain status information of display elements displayed on a display interface of the bar-shaped electronic shelf label, the status information of the display elements including at least the first position information of the display elements in the display interface; changing, by the mobile terminal, the position information of a display element from a first position information to a second position information and generating an element position adjustment instruction; configuring the bar-shaped electronic shelf label to receive the element position adjustment instruction, change the position of the display element from the first position to the second position in response to the element position adjustment instruction, and display the display element on the display interface of the bar-shaped electronic shelf label.

With the above technical solutions, the technical solutions provided by the present disclosure have at least the following advantages.

The display adjustment method and device for a bar-shaped electronic shelf label provided by the present disclosure includes: configuring a mobile terminal to be coupled with a bar-shaped electronic shelf label and obtain status information of display elements displayed on a display interface of the bar-shaped electronic shelf label; changing, by the mobile terminal, the position information of a display element from a first position information to a second position information and generating an element position adjustment instruction; configuring the bar-shaped electronic shelf label to receive the element position adjustment instruction, change the position of the display element from the first position to the second position in response to the element position adjustment instruction, and display the display element on the display interface of the bar-shaped electronic shelf label. In the related art, in order to adjust the display of elements in the bar-shaped electronic shelf label, it is necessary to install a touch bar under the bar-shaped electronic shelf label, and slide the touch bar to move the elements. Compared with this, the embodiment of the present disclosure does not need to install a touch bar in the bar-shaped electronic shelf label, and avoids the problem of poor adjustment accuracy caused by touch jitter when adjusting the element display by sliding the touch bar, thereby improving the performance of the adjustment of the element display in the bar-shaped electronic shelf label.

Figure 8:
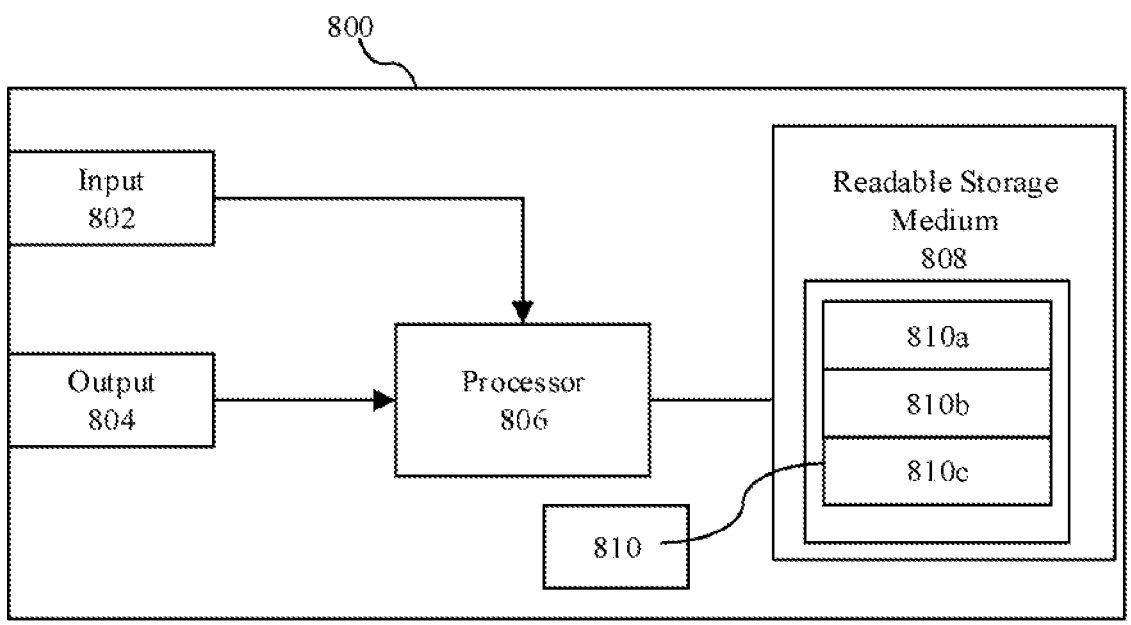
FIG. 8 is a diagram showing an example hardware arrangement of an electronic device according to an embodiment of the present disclosure.

FIG. 8 is a diagram showing an example hardware arrangement of an electronic device 800 according to an embodiment of the present disclosure. The hardware arrangement 800 may include a processor 806 (for example, a digital signal processor (DSP), a micro-controller, a processor, a logic control device, and the like). The processor 806 may be a single processing unit or a plurality of processing units for performing different actions of the flows described herein. The arrangement 800 may also include an input unit 802 for receiving signals from other entities, and an output unit 804 for providing signals to other entities. The input unit 802 and the output unit 804 may be arranged as a single entity or as separate entities.

In some embodiments, the electronic device 800 may be, for example, one or more of the mobile terminal, the bar-shaped electronic shelf label, and/or the server in the above solution. In the case where, for example, the electronic device 800 is a mobile terminal, its input unit 802 may be, for example, a touch screen, a keypad, a touch pad, a scroll wheel, a stylus pen, a microphone, and the like, and its output unit 804 may be, for example, a display, a touch screen, a speaker, a vibration motor, and the like. In the case where, for example, the electronic device 800 is a server, its input unit 802 may be, for example, a keyboard, a mouse, a microphone, and the like, and its output unit 804 may be, for example, a display, a speaker, a printer, and the like. In the case where, for example, the electronic device 800 is a bar-shaped electronic shelf label, its input unit 802 may be, for example, a serial port, a communication unit, a touch screen, and the like, and its output unit 804 may be, for example, a bar-shaped display, a communication unit, and the like.

Moreover, the arrangement 800 may include at least one readable storage medium 808 in the form of a non-volatile or volatile memory, such as an electrically erasable programmable read only memory (EEPROM), a flash memory, and/or a hard drive. The readable storage medium 808 includes a computer program 810 that includes codes/computer readable instructions that, when executed by the processor 806 in the arrangement 800, cause the hardware arrangement 800 and/or the device including the hardware arrangement 800 to perform the flow of any one or more of the mobile terminal, the bar-shaped electronic shelf label and/or the server as described above in connection with FIG. 1-FIG. 4 and any variations thereof.

The computer program 810 may be configured as computer program codes haying an architecture of computer program modules 810-810C, for example. Therefore, the codes in the computer program of the arrangement 800 includes: a module 810A for communicatively coupling. with the bar-shaped electronic shelf label and obtaining status information of display elements displayed on a display interface of the bar-shaped electronic shelf label, the status information of the display elements comprising at least position information of the display elements in the display interface. The codes in the computer program further includes: a module 810B changing the position infomiation of a display element from a first position information to a second position information and generating an element position adjustment instruction. The codes in the computer program further includes: a module 810C for sending the element position adjustment instmction to the bar-shaped electronic shelf label to instruct the bar-shaped electronic shelf label to change the position of the display element from the first position to the second position.

The computer program modules may substantially perform the various actions in the flows illustrated in FIG. 1-FIG. 4 to simulate any hardware implementation. In other words, when different computer program modules are executed in the processor 808, they may correspond to different units in any hardware implementation.

Although the code means in the embodiment disclosed above in connection with FIG. 8 is implemented as a computer program module that, when executed in the processor 808, causes the hardware arrangement 800 to perform the actions described above in connection with FIG. 1-FIG. 4, however in alternative implementations, at least one of the code means may be implemented at least partially as a hardware circuit.

The processor may be a single CPU (Central Processing Unit), but may also include two or more processing units. For example, the processor may include a general purpose microprocessor, an instruction set processor, and/or a related chip-set and/or a special purpose microprocessor (for example, an application specific integrated circuit (ASIC)). The processor may also include an on-board memory for caching purposes. The computer program may be carried by a computer program product connected to the processor. The computer program product may include a computer readable medium having stored thereon a computer program. For example, the computer program product may be flash memory, random access memory (RAM), read only memory (ROM), and EEPROM, and the computer program modules described above may be distributed to different computer program products in the form of memory within the device in alternative embodiments.

Figure 9:
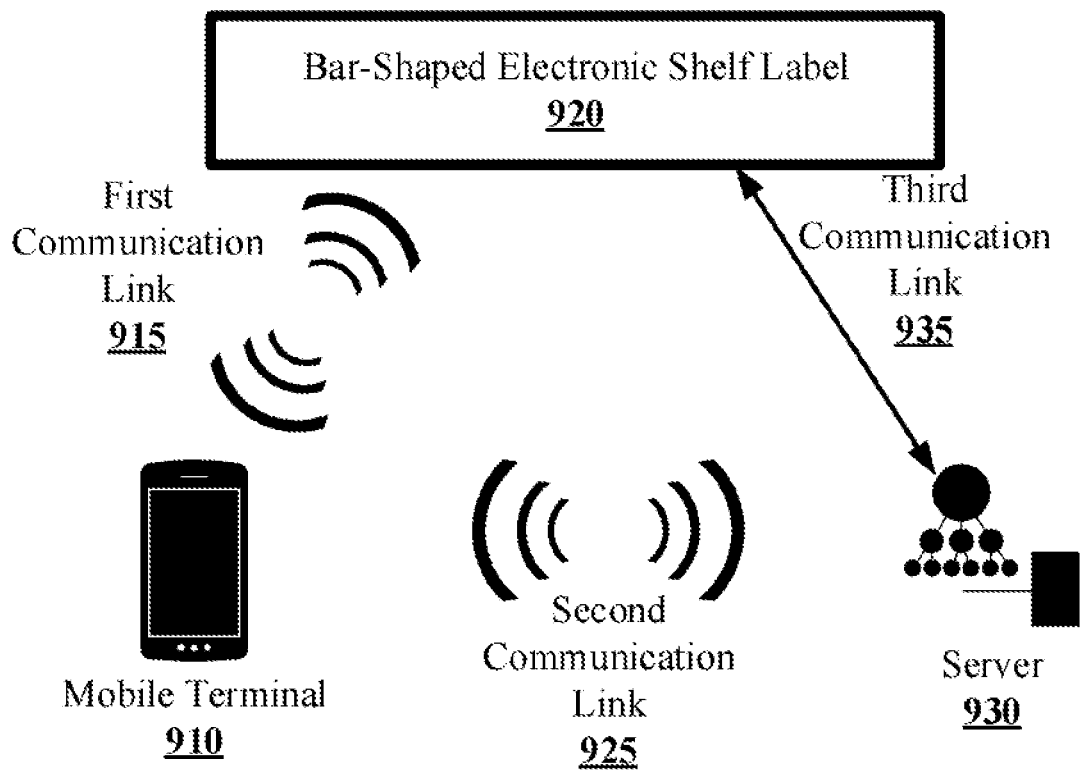
FIG. 9 is a schematic diagram showing a display adjustment system for a bar-shaped electronic shelf label according to an embodiment of the present disclosure.

FIG. 9 is a schematic diagram showing a display adjustment system 900 for a bar-shaped electronic shelf label according to an embodiment of the present disclosure. As shown in FIG. 9, the system 900 may include a mobile terminal 910 and one or more bar-shaped electronic shelf labels 920. In addition, in some embodiments, the system 900 may further include an optional server 930.

As shown in FIG. 9, the mobile terminal 900 may communicate with one or more bar-shaped electronic shelf labels 920 through the first communication link 915. In some embodiments, the first communication link 915 may be a Bluetooth Low Energy (BLE) communication link. However, the present disclosure is not limited to this, and the first communication link may also be, for example, a Wi-Fi direct link, an infrared link, an RFID communication link, an NFC communication link, or the like. In addition, the mobile terminal 910 may communicate with the server 930 through the second communication link 925 to perform functions such as identity verification, tag display element obtaining, and adjustment. In some embodiments, the second communication link 925 may be, for example, a Wi-Fi link, an RF link (including communication links such as 2G, 3G, 4G, 5G, and the like), a WiMAX link, an UMB (Ultra Mobile Broadband) link and the like. In addition, the bar-shaped electronic shelf label 920 may communicate with the server 930 through the third communication link 935 to, for example, verify the identity of the mobile terminal 910 and receive one or more display elements' content, attributes, position and other data from the server 930. In some embodiments, the third communication link 935 may be a wired or wireless communication link, including (but not limited to), for example: an Ethernet link, an xDSL link, an optical fiber link, a Wi-Fi link, an RF link, a WiMAX link, and the like.

As described above with reference to FIG. 1-FIG. 4, the mobile terminal 910 and the bar-shaped electronic shelf label 920 may interact via the server 930 or directly interact to implement the adjustment of the display elements in the bar-shaped electronic shelf label 920, such as position adjustment, content adjustment, and adjustment of various other attributes.

In a common application scenario, the mobile terminal 910 may send verification request including identity verification information (for example, the user name/password combination, fingerprint, facial features, and the like, entered by the user on the mobile terminal 910) to the server 930 via the second communication link 925. If the verification of the server 930 is successful, it may return, to the mobile terminal 910, a response message indicating that the mobile terminal can perform the display adjustment function for the bar-shaped electronic shelf label 920. If the verification fails, the server 930 returns, to the mobile terminal 910, a response message indicating that the mobile terminal cannot perform the display adjustment function, or directly ignores the verification request.

Next, in the case where the mobile terminal 910 receives a response message indicating that the mobile terminal can perform the display adjustment function through the second communication link 925, it may scan the periodic broadcast signal emitted by the surrounding bar-shaped electronic shelf labels 920. For example, as described above, the mobile terminal 910 may sort all the broadcast signals it scans, for example, by received signal strength or by tag ID, and present it to the user of the mobile terminal 910. The user may select a corresponding bar-shaped electronic shelf label as needed to try to establish the first communication link 915 with the designated shelf label 920. After that, the mobile terminal 910 may provide the shelf label 920 with verification information (for example, a username/password, or a temporary token provided by the server 930 when the mobile terminal 910 authenticates to the server 930). The shelf label 920 may communicate with the server 930 through the third communication link 935 to verify that the verification information is valid, and return to the mobile terminal 910 the content and/or attributes (for example, position, size, color, and the like) of one or more display elements that it currently displays. If the shelf label 920 fails to verify the verification information of the mobile terminal 910 with the server 930, the shelf label 920 may directly disconnect the first communication link 915 and refuse to perform subsequent operations.

When receiving the content and/or attributes of the display elements returned by the bar-shaped electronic shelf label 920, the mobile terminal 910 may adjust corresponding display elements as described above so that the elements have new content and/or attributes, for example. The mobile terminal may also instruct to the shelf label 920 accordingly so that the bar-shaped electronic shelf label 920 updates the display of its display elements.

In addition, in other embodiments, the communication content between the mobile terminal 910 and the bar-shaped electronic shelf label 920 may also be relayed via the server 930 without direct communication. For example, the mobile terminal 910 may send the adjusted content and/or attributes of the display elements to the server 930 through the second communication link 925 to indirectly adjust the display of the display elements at the shelf label 920 through the server 930.

Those skilled in the art should understand that the embodiments of the present application may be provided as a method, a system, or a computer program product. Thus, the present application may take the form of an entirely hardware embodiment, an entirely software embodiment, or an embodiment combining software and hardware aspects. Furthermore, the present application may take the form of a computer program product embodied on one or more computer-usable storage media (including but not limited to disk memory, CD-ROM, optical memory, and the like) having computer-usable program code embodied therein.

The present application is described with reference to flowcharts and/or block diagrams of the method, the device (system), and the computer program product according to the embodiments of the present application. It should be understood that each process and/or block in the flowcharts and/or block diagrams, and combinations of the processes and/or blocks in the flowcharts and/or block diagrams may be implemented by computer program instructions. The computer program instructions may be provided to a processor of a general purpose computer, a special purpose computer, an embedded processor, or other programmable data processing device to generate a machine, such that instructions executed by a processor of a computer or other programmable data processing device generate an device for implementing the functions specified in one or more flows of a flowchart and/or one or more blocks of a block diagram.

The computer program instructions may also be stored in a computer-readable memory capable of directing a computer or other programmable data processing device to operate in a specific manner, so that instructions stored in the computer-readable memory produce an article of manufacture comprising an instruction device. The instruction device implements the functions specified in one or more flows of a flowchart and/or one or more blocks of a block diagram.

The computer program instructions may also be loaded onto a computer or other programmable data processing device such that a series of operational steps are performed on the computer or other programmable device to generate computer-implemented processes, thus, the instructions executed on the computer or other programmable device provide steps for implementing the functions specified in one or more flows of a flowchart and/or one or more blocks of a block diagram.

In a typical configuration, the computing device includes one or more processors (CPUs), input/output interfaces, network interfaces, and memory.

The memory may include non-permanent memory (random access memory (RAM)) and/or non-volatile memory (such as read-only memory (ROM) or flash memory (flash RAM)) in computer-readable media. The memory is an example of a computer-readable medium.

Computer-readable medium, including permanent and non-permanent, removable and non-removable media, may store information by any method or technology. The information may be computer readable instructions, data structures, modules of programs, or other data. Examples of computer storage media include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technologies, read-only compact disc read-only memory (CD-ROM), digital versatile disc (DVD) or other optical storage, magnetic cassettes, tape storage, disk storage or other magnetic storage devices or any other non-transmission media, may be used to store information that can be accessed by computing devices. As defined herein, computer-readable medium does not include temporary computer-readable media (transitory media), such as modulated data signals and carriers.

It should be also noted that the terms "include", "including" or any other variants thereof are intended to cover non-exclusive inclusion, so that a process, method, article or device including a series of elements includes not only those elements, but also includes other elements not explicitly listed, or elements inherent to such a process, method, product, or device. Without more restrictions, an element limited by the sentence "including a . . . " does not exclude that there are other identical elements in the process, method, product, or device that includes the element.

Those skilled in the art should understand that the embodiments of the present disclosure may be provided as a method, a system, or a computer program product. Thus, the present disclosure may take the form of an entirely hardware embodiment, an entirely software embodiment, or an embodiment combining software and hardware aspects. Furthermore, the present application may take the form of a computer program product embodied on one or more computer-usable storage media (including but not limited to disk memory, CD-ROM, optical memory, and the like) having computer-usable program code embodied therein.

The above are only embodiments of the present application, and are not intended to limit the present application. For those skilled in the art, the present application may have various modifications and changes. Any modifications, equivalents, improvements, and the like, which are made within the spirit and principle of the present application shall be included in the scope of the claims of the present application.

We claim:

1. A display adjustment method performed at a mobile terminal for a bar-shaped electronic shelf label, the method comprising:
   communicatively coupling, by the mobile terminal, with the bar-shaped electronic shelf label;
   obtaining, by the mobile terminal, status information of display elements displayed on a display interface of the bar-shaped electronic shelf label, the status information of the display elements comprising at least position information of the display elements in the display interface;
   changing, by the mobile terminal, the position information of a display element from a first position information to a second position information and generating an element position adjustment instruction; and
   sending, by the mobile terminal, the element position adjustment instruction to the bar-shaped electronic shelf label to instruct the bar-shaped electronic shelf label to change the position of the display element from the first position to the second position,
   wherein after changing, by the mobile terminal, the position information of the display element from a first position information to a second position information, the method further comprises:
   obtaining, by the mobile terminal, a size of the bar-shaped electronic shelf label, corresponding start position and end position of the adjusted element in the mobile terminal, and a final position of a final element in the mobile terminal;
   calculating, by the mobile terminal, an adjustment ratio of the adjusted element according to the start position, the end position, and the final position;

determining, by the mobile terminal, as an adjustment distance of the adjusted element, a product of the adjustment ratio and the size of the bar-shaped electronic shelf label.

2. The method of claim 1, wherein the status information of the display elements further comprises information on a number of display elements and position information of each display element in the bar-shaped electronic shelf label, and wherein the step of generating the element position adjustment instruction comprises:

determining, by the mobile terminal, an adjusted position, in the bar-shaped electronic shelf label, of the adjusted element according to the position, in the bar-shaped electronic shelf label, of the adjusted element and the adjustment distance;

generating, by the mobile terminal, the element position adjustment instruction according to the adjusted position, in the bar-shaped electronic shelf label, of the adjusted element.

3. The method of claim 1, wherein before communicatively coupling, by the mobile terminal, with the bar-shaped electronic shelf label, the method further comprises:

receiving, by the mobile terminal, login information and verifying a user's identity according to the login information;

when the verification is passed, triggering, by the mobile terminal, scan communicable bar-shaped electronic shelf labels, sorting and outputting the communicable bar-shaped electronic shelf labels according to strengths of communication signals so as to display the communicable bar-shaped electronic shelf labels in the mobile terminal;

sending, by the mobile terminal, a communication establishment request, the communication establishment request carrying identification information of the bar-shaped electronic shelf label to be communicated.

4. The method of claim 3, further comprising:

scanning, by the mobile terminal, broadcast information sent by the bar-shaped electronic shelf label at preset time intervals, the broadcast information carrying identification information of the bar-shaped electronic shelf label;

sending, by the mobile terminal, the login information to the bar-shaped electronic shelf label and requesting the bar-shaped electronic shelf label to verify the user's identity according to the login information, when the mobile terminal requests and attempts to establish communication with the bar-shaped electronic shelf label according to the broadcast information.

5. The method of claim 1, wherein the step of obtaining, by the mobile terminal, status information of display elements displayed on a display interface of the bar-shaped electronic shelf label comprises:

sending, by the mobile terminal, a display element status information obtaining request to instruct the bar-shaped electronic shelf label to extract the status information of the display elements and send encrypted status information of the display elements as a request response message;

receiving, by the mobile terminal, the request response message, the request response message carrying a display element status characteristic value corresponding to the status information of the display elements; and analyzing, by the mobile terminal, the display element status characteristic value to obtain the status information of the display elements.

6. A mobile terminal for adjusting display of a bar-shaped electronic shelf label, comprising:

a processor;

a memory storing instructions that, when executed by the processor, cause the processor to:

communicatively couple, by the mobile terminal, with the bar-shaped electronic shelf label;

obtain, by the mobile terminal, status information of display elements displayed on a display interface of the bar-shaped electronic shelf label, the status information of the display elements comprising at least position information of the display elements in the display interface;

change, by the mobile terminal, the position information of a display element from a first position information to a second position information and generate an element position adjustment instruction; and send, by the mobile terminal, the element position adjustment instruction to the bar-shaped electronic shelf label to instruct the bar-shaped electronic shelf label to change the position of the display element from the first position to the second position, wherein the instructions, when executed by the processor, further cause the processor to:

obtain, by the mobile terminal, a size of the bar-shaped electronic shelf label, corresponding start position and end position of the adjusted element in the mobile terminal, and a final position of a final element in the mobile terminal;

calculate, by the mobile terminal, an adjustment ratio of the adjusted element according to the start position, the end position and the final position;

determine, by the mobile terminal, as an adjustment distance of the adjusted element, a product of the adjustment ratio and the size of the bar-shaped electronic shelf label.

7. The mobile terminal of claim 6, wherein the status information of the display elements further comprises information on a number of display elements and position information of each display element in the bar-shaped electronic shelf label, and the instructions, when executed by the processor, further cause the processor to:

determine, by the mobile terminal, an adjusted position, in the bar-shaped electronic shelf label, of the adjusted element according to the position, in the bar-shaped electronic shelf label, of the adjusted element and the adjustment distance; and generate, by the mobile terminal, the element position adjustment instruction according to the adjusted position, in the bar-shaped electronic shelf label, of the adjusted element.

8. The mobile terminal of claim 6, wherein the instructions, when executed by the processor, further cause the processor to:

receive, by the mobile terminal, login information and verify the user's identity according to the login information;

when the verification is passed, trigger, by the mobile terminal, scan communicable bar-shaped electronic shelf labels, sort and output the communicable bar-shaped electronic shelf labels according to strengths of communication signals so as to display the communicable bar-shaped electronic shelf labels in the mobile terminal;

send, by the mobile terminal, a communication establishment request, the communication establishment request carrying identification information of the bar-shaped electronic shelf label to be communicated.

9. The mobile terminal of claim 8, wherein the instructions, when executed by the processor, further cause the processor to:
scan, by the mobile terminal, broadcast information sent by the bar-shaped electronic shelf label at preset time intervals, the broadcast information carrying identification information of the bar-shaped electronic shelf label;
send, by the mobile terminal, the login information to the bar-shaped electronic shelf label and request the bar-shaped electronic shelf label to verify the user's identity according to the login information, when the mobile terminal requests to establish communication with the bar-shaped electronic shelf label according to the broadcast information.

10. The mobile terminal of claim 6, wherein the instructions, when executed by the processor, further cause the processor to:
send, by the mobile terminal, a display element status information obtaining request to instruct the bar-shaped electronic shelf label to extract the status information of the display elements and send encrypted status information of the display elements as a request response message;
receive, by the mobile terminal, the request response message, the request response message carrying a display element status characteristic value corresponding to the status information of the display elements; and
analyze, by the mobile terminal, the display element status characteristic value to obtain the status information of the display elements.

11. A system comprising:
the mobile terminal of claim 7;
one or more bar-shaped electronic shelf labels capable of being communicatively coupled with the mobile terminal and configured to adjust displayed electronic labels under control of the mobile terminal.

12. The system of claim 11, further comprising:
a server capable of being communicatively coupled with the mobile terminal and the one or more bar-shaped electronic shelf labels, and configured to authenticate the mobile terminal, and provide the mobile terminal with information about the one or more bar-shaped electronic shelf labels in response to successful authentication.

13. A non-transitory computer-readable storage medium wherein the non-transitory computer-readable storage medium stores multiple instructions adapted to be executed by a processor of a mobile terminal to cause the processor to:
communicatively couple, by the mobile terminal, with a bar-shaped electronic shelf label;
obtain, by the mobile terminal, status information of display elements displayed on a display interface of the bar-shaped electronic shelf label, the status information of the display elements comprising at least position information of the display elements in the display interface;
change, by the mobile terminal, the position information of a display element from a first position information to a second position information and generate an element position adjustment instruction; and
send, by the mobile terminal, the element position adjustment instruction to the bar-shaped electronic shelf label to instruct the bar-shaped electronic shelf label to change the position of the display element from the first position to the second position,
wherein the instructions, when executed by the processor, further cause the processor to:
obtain, by the mobile terminal, a size of the bar-shaped electronic shelf label, corresponding start position and end position of the adjusted element in the mobile terminal, and a final position of a final element in the mobile terminal;
calculate, by the mobile terminal, an adjustment ratio of the adjusted element according to the start position, the end position and the final position;
determine, by the mobile terminal, as an adjustment distance of the adjusted element, a product of the adjustment ratio and the size of the bar-shaped electronic shelf label.

14. The non-transitory computer-readable storage medium of claim 13, wherein the status information of the display elements further comprises information on a number of display elements and position information of each display element in the bar-shaped electronic shelf label, and the instructions, when executed by the processor, further cause the processor to:
determine, by the mobile terminal, an adjusted position, in the bar-shaped electronic shelf label, of the adjusted element according to the position, in the bar-shaped electronic shelf label, of the adjusted element and the adjustment distance; and
generate, by the mobile terminal, the element position adjustment instruction according to the adjusted position, in the bar-shaped electronic shelf label, of the adjusted element.

15. The non-transitory computer-readable storage medium of claim 13, wherein the instructions, when executed by the processor, further cause the processor to:
receive, by the mobile terminal, login information and verify the user's identity according to the login information;
when the verification is passed, trigger the mobile terminal to scanning of communicable bar-shaped electronic shelf labels, sort and output the communicable bar-shaped electronic shelf labels according to strengths of communication signals so as to display the communicable bar-shaped electronic shelf labels in the mobile terminal;
send, by the mobile terminal, a communication establishment request, the communication establishment request carrying identification information of the bar-shaped electronic shelf label to be communicated.

16. The non-transitory computer-readable storage medium of claim 15, wherein the instructions, when executed by the processor, further cause the processor to:
scan, by the mobile terminal, broadcast information sent by the bar-shaped electronic shelf label at preset time intervals, the broadcast information carrying identification information of the bar-shaped electronic shelf label;
send, by the mobile terminal, the login information to the bar-shaped electronic shelf label and request the bar-shaped electronic shelf label to verify the user's identity according to the login information, when the mobile terminal requests to establish communication with the bar-shaped electronic shelf label according to the broadcast information.

17. The non-transitory computer-readable storage medium of claim 13, wherein the instructions, when executed by the processor, further cause the processor to:

send, by the mobile terminal, a display element status information obtaining request to instruct the bar-shaped electronic shelf label to extract the status information of the display elements and send encrypted status information of the display elements as a request response message;

receive, by the mobile terminal, the request response message, the request response message carrying a display element status characteristic value corresponding to the status information of the display elements; and analyze, by the mobile terminal, the display element status characteristic value to obtain the status information of the display elements.

\* \* \* \* \*